(12) United States Patent
Tapuchievici (10) Patent No.: US 8,353,697 B2
(45) Date of Patent: Jan. 15, 2013

(54) INJECTION MOLDING APPARATUS HAVING A PRESSURE DISK DISPOSED BETWEEN A BACK PLATE AND A VALVE PIN ACTUATOR

(75) Inventor: Calin Tapuchievici, Markham (CA)

(73) Assignee: Mold-Masters (2007) Limited, Georgetown, Ontario (CA)

( * ) Notice: Subject to any disclaimer, the term of this patent is extended or adjusted under 35 U.S.C. 154(b) by 21 days.

(21) Appl. No.: 12/739,246

(22) PCT Filed: Oct. 21, 2008

(86) PCT No.: PCT/CA2008/001854
§ 371 (c)(1),
(2), (4) Date: Apr. 22, 2010

(87) PCT Pub. No.: WO2009/052611
PCT Pub. Date: Apr. 30, 2009

(65) Prior Publication Data
US 2010/0233311 A1 Sep. 16, 2010

Related U.S. Application Data

(60) Provisional application No. 60/981,682, filed on Oct. 22, 2007.

(51) Int. Cl.
*B29C 45/23* (2006.01)
(52) U.S. Cl. ............... 425/564; 264/328.9; 425/566
(58) Field of Classification Search ............ 425/562, 425/563, 564, 565, 566; 264/328.9
See application file for complete search history.

(56) References Cited

U.S. PATENT DOCUMENTS

| | | | |
|---|---|---|---|
| 4,043,726 A | 8/1977 | Tsunemoto et al. |
| 4,213,751 A | 7/1980 | Fernandez |
| 4,588,367 A | 5/1986 | Schad |
| 4,682,945 A | 7/1987 | Schad |
| 4,964,795 A | 10/1990 | Tooman |
| 5,125,827 A | 6/1992 | Gellert |
| 5,269,677 A | 12/1993 | Gauler |
| 5,334,008 A | 8/1994 | Gellert |
| 5,374,182 A | 12/1994 | Gessner |
| 5,804,231 A | 9/1998 | Prophet et al. |
| 5,853,776 A | 12/1998 | Meijer |
| 6,062,846 A | 5/2000 | Kalemba |
| 6,203,305 B1 | 3/2001 | Hofstetter et al. |

(Continued)

FOREIGN PATENT DOCUMENTS

CA 2 512 626 1 8/2004

(Continued)

OTHER PUBLICATIONS

"Integrated Hot Runner", *Incoe Brochure*, (Apr. 2004).

(Continued)

*Primary Examiner* — Tim Heitbrink
(74) *Attorney, Agent, or Firm* — Medler Ferro PLLC (57) ABSTRACT

An actuator is disposed between a back plate and a manifold and is connected to a valve pin. A nozzle flange, locating ring, or pressure disc can transmit a first load between the manifold and a mold plate. A pressure disc can be disposed between the actuator and the back plate. The pressure disc transmits a second load between the back plate and the manifold through the actuator.

26 Claims, 6 Drawing Sheets

U.S. PATENT DOCUMENTS

| | | |
|---|---|---|
| 6,261,084 B1 | 7/2001 | Schmidt |
| 6,343,925 B1 | 2/2002 | Jenko |
| 6,368,542 B1 | 4/2002 | Steil et al. |
| 6,379,144 B1 | 4/2002 | Wright |
| 6,561,790 B2 | 5/2003 | Blais et al. |
| 6,851,946 B1 | 2/2005 | Plass et al. |
| 7,160,100 B2 | 1/2007 | Hagelstein et al. |
| 7,165,958 B2 | 1/2007 | Jenko |
| 7,207,796 B2 | 4/2007 | Rosner |
| 2003/0143298 A1* | 7/2003 | Blais .................. 425/566 |
| 2006/0083811 A1 | 4/2006 | Fairy et al. |
| 2006/0204611 A1 | 9/2006 | Serniuk et al. |
| 2007/0082082 A1 | 4/2007 | Feick et al. |

FOREIGN PATENT DOCUMENTS

| | | | |
|---|---|---|---|
| DE | 10 2004 022 036 B3 | | 7/2005 |
| EP | 0 264 723 A2 | | 4/1988 |
| EP | 0 765 728 A2 | | 4/1997 |
| EP | 0 765 728 A3 | | 4/1997 |
| EP | 1 459 864 A1 | | 9/2004 |
| JP | 63-95923 A | | 4/1988 |
| JP | 2002-283411 A | | 10/2002 |
| WO | WO-01/78962 A1 | | 10/2001 |
| WO | 03/009986 A1 | | 2/2003 |
| WO | 03/063310 A1 | | 8/2003 |

OTHER PUBLICATIONS

"Hot Runner Manifolds", *Synventive Molding Solutions*, (Jul. 2006).
"International Search Report and Written Opinion", *International Application* No. PCT/CA2008/001854, (mailed Jan 9, 2009).
Supplemental European Search Report and Search Report Opinion, Application No. EP 08842365.2, mailed Jul. 27, 2012.

* cited by examiner

INJECTION MOLDING APPARATUS HAVING A PRESSURE DISK DISPOSED BETWEEN A BACK PLATE AND A VALVE PIN ACTUATOR

CROSS-REFERENCE TO RELATED APPLICATION

This application claims the benefit of U.S. provisional patent application Ser. No. 60/981,682 filed Oct. 22, 2007, which is hereby incorporated by reference in its entirety herein.

BACKGROUND

1. Field of the Invention

The present invention related to injection molding, and more particularly, to an injection molding apparatus.

2. Related Art

Injection molding apparatuses, such as hot halves and hot runners, are frequently loaded to connect and seal various components. Loading may be due to a manufactured pre-load and/or forces generated by heat expansion when the hot runner is brought up to operating temperature. When loading is improper, components can be damaged or molding material can leak.

SUMMARY OF THE INVENTION

In an embodiment of the present invention, an injection molding apparatus includes a back plate and an actuator for moving a valve pin. A pressure disc is disposed between the back plate and the actuator.

In another embodiment of the present invention, an injection molding apparatus includes a back plate, a mold plate, a manifold disposed between the back plate and the mold plate, a nozzle, and an actuator connected to a valve pin. A first support transmits a first load between the manifold and the mold plate, and a second support disposed between the back plate and the actuator transmits a second load between the back plate and the manifold.

BRIEF DESCRIPTION OF THE FIGURES

Embodiments of the present invention will now be described more fully with reference to the accompanying drawings where like reference numbers indicate similar structure.

DETAILED DESCRIPTION OF THE INVENTION

Figure 1:
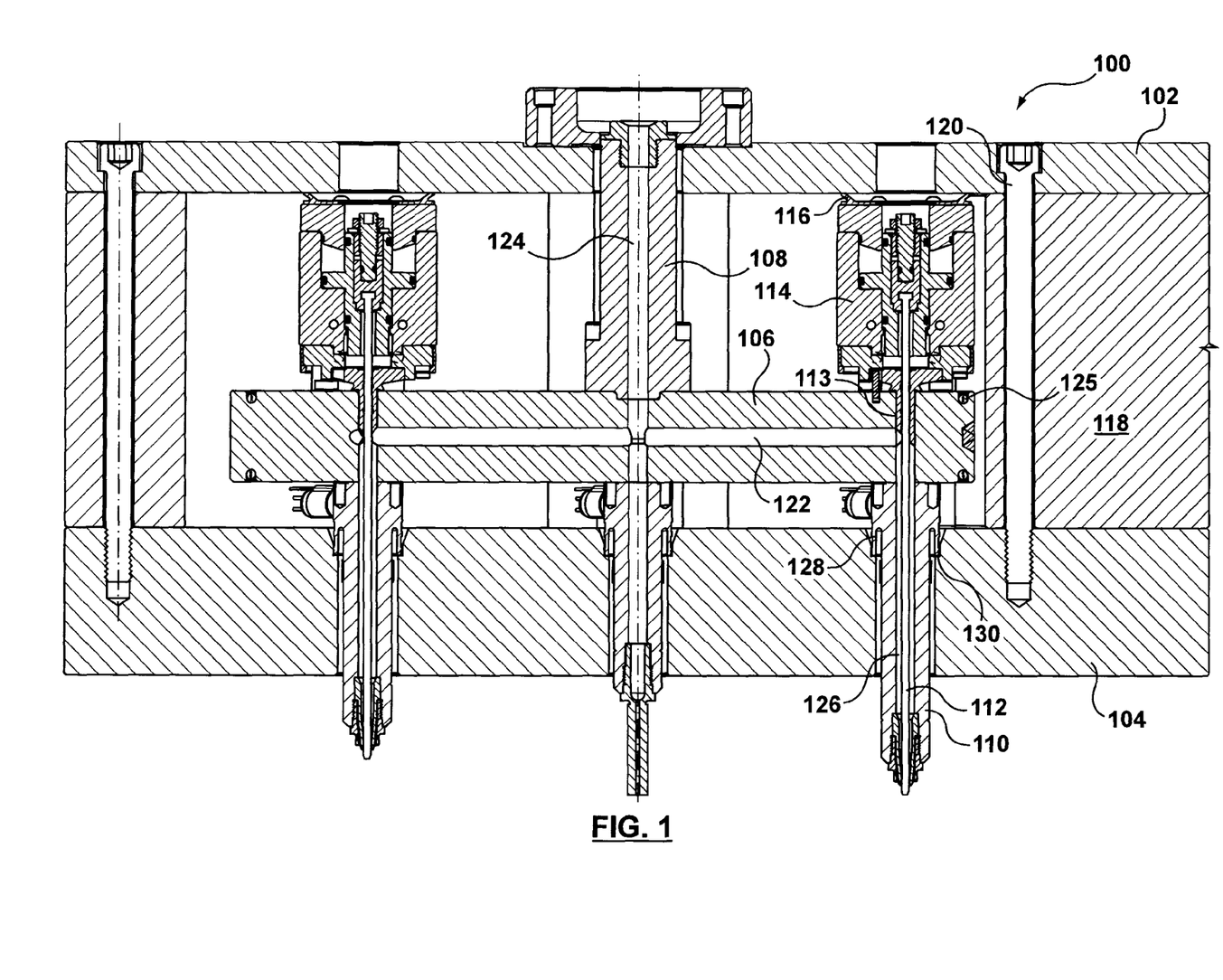
FIG. 1 is a cross-sectional view of an injection molding apparatus according to an embodiment of the present invention.

FIG. 1 shows an injection molding apparatus 100 according to an embodiment of the present invention. The features and aspects described for the other embodiments can be used accordingly with the present embodiment.

The injection molding apparatus 100 includes a back plate 102, a mold plate 104 connected to the back plate 102, a manifold 106 disposed between the back plate 102 and the mold plate 104, an inlet component 108 connected to the manifold 106, nozzles 110 connected to the manifold 106, valve pins 112, valve pin bushings 113, actuators 114 disposed between the back plate 102 and the manifold 106, and pressure discs 116 disposed between the actuators 114 and the back plate 102. The injection molding apparatus 100 can be a hot half or a hot runner.

The back plate 102 and mold plate 104 are separated by an intermediate plate 118 and are connected by bolts 120. The bolts 120 are threaded into the mold plate 104 and not threaded into the intermediate plate 118. The bolts 120 can be tightened to establish a bolt load.

The manifold 106 defines a manifold channel 122 and has a manifold heater 125, such as the resistance wire heater depicted. In other embodiments, more manifolds can be provided.

The inlet component 108 defines an inlet channel 124 in communication with the manifold channel 122. Molding material (e.g., plastic melt) can be injected into the inlet channel 124 by an injection molding machine (not shown) or the like.

The nozzles 110 define nozzle channels 126 in communication with the manifold channel 122. Three nozzles are depicted, but more or fewer nozzles can be used. The nozzles 110 can all be of the same kind or can be of different kinds (as shown). Any of the nozzles generally include a nozzle body, a tip assembly, a heater, a thermocouple, or a terminal end. In this embodiment, the nozzles 110 each include a flange 128 (first support) that rests on a shoulder 130 of the mold plate 104. The flanges 128 transmit a first load between the manifold 106 and the mold plate 104. Each flange 128 transmits a portion of the first load.

The valve pins 112 extend through two of the nozzles 110 for controlling flow of molding material through the respective nozzle channels 126. The number of valve pins 112 used can correspond to the number of valve-gated nozzles used. In this embodiment, the middle nozzle does not have valve pin.

The valve pin bushings 113 are coupled to the manifold 106 and seal against leakage at the valve pins 112. In this embodiment, the valve pin bushings 113 are held to the manifold 106 independent of the actuators 114. In other embodiments, the valve pin bushings 113 can be held to the manifold 106 by the actuators 114.

The actuators 114 are disposed between the back plate 102 and the manifold 106. The actuators 114 can be pneumatic, hydraulic, electric, magnetic, or some other design. The actuators 114 can include cylinders, pistons, cap plates, valve pin adjustment mechanisms, seals, etc. Moveable parts of the actuators 114 are connected to the valve pins 112 so as to move the valve pins 112. Any number of actuators 114 can be used, provided that the valve pins 112 can be actuated as desired. The actuators 114 can all be the same or can be different.

The pressure discs 116 (second supports) are situated between the actuators 114 and the back plate 102. In this embodiment, each pressure disc 116 is in direct contact with the back plate 102 and a cap plate of the respective actuator 114. The pressure discs 116 transmit and focus a second load between the back plate 102 and the manifold 106 through the actuators 114 and optionally through the valve pin bushings 113. Each pressure disc 116 transmits a portion of the second load. Transmitting and focusing force to be inline with the components which require sealing can improve the sealing or lessen the total forces required.

A portion of or the entire bolt load, provided by bolts 120, is transmitted from the mold plate 104, to the flanges 128 of the nozzles 110, and from the nozzles 110 into the manifold 106. This is the first load. A portion of or the entire bolt load is transmitted from the back plate 102 to the pressure discs 116, through the actuators 114, and into the manifold 106. This is the second load. When there are no other loads applied to the injection molding apparatus 100, ideally the sum of the first load and the second load acting on the manifold 106 is zero. That is, the internal loads caused by tightening the bolts 120 are balanced. The total load in all the pressure discs 116 is the same as the total load in all the flanges 128. As a result, the nozzles 110 can be tightly sealed to the manifold 106 and/or can be tightly seated in their positions in the mold plate 104.

The distributions of the first and second loads may be symmetrical or may be asymmetrical. For example, geometry may dictate that one pressure disc 116 take more of the second load than another pressure disc 116. The distributions of the first and second loads are also affected by how uniformly the bolts 120 are tightened. For example, one bolt may be tightened more than the others to increase a share of the second load for a particular pressure disc 116. The same applies to all loaded components. For example, if a particular nozzle 110 leaks at its junction with the manifold 106, tightening a particular bolt 120 can increase the portion of the first load at the junction to reduce or eliminate the leakage.

Figure 2:
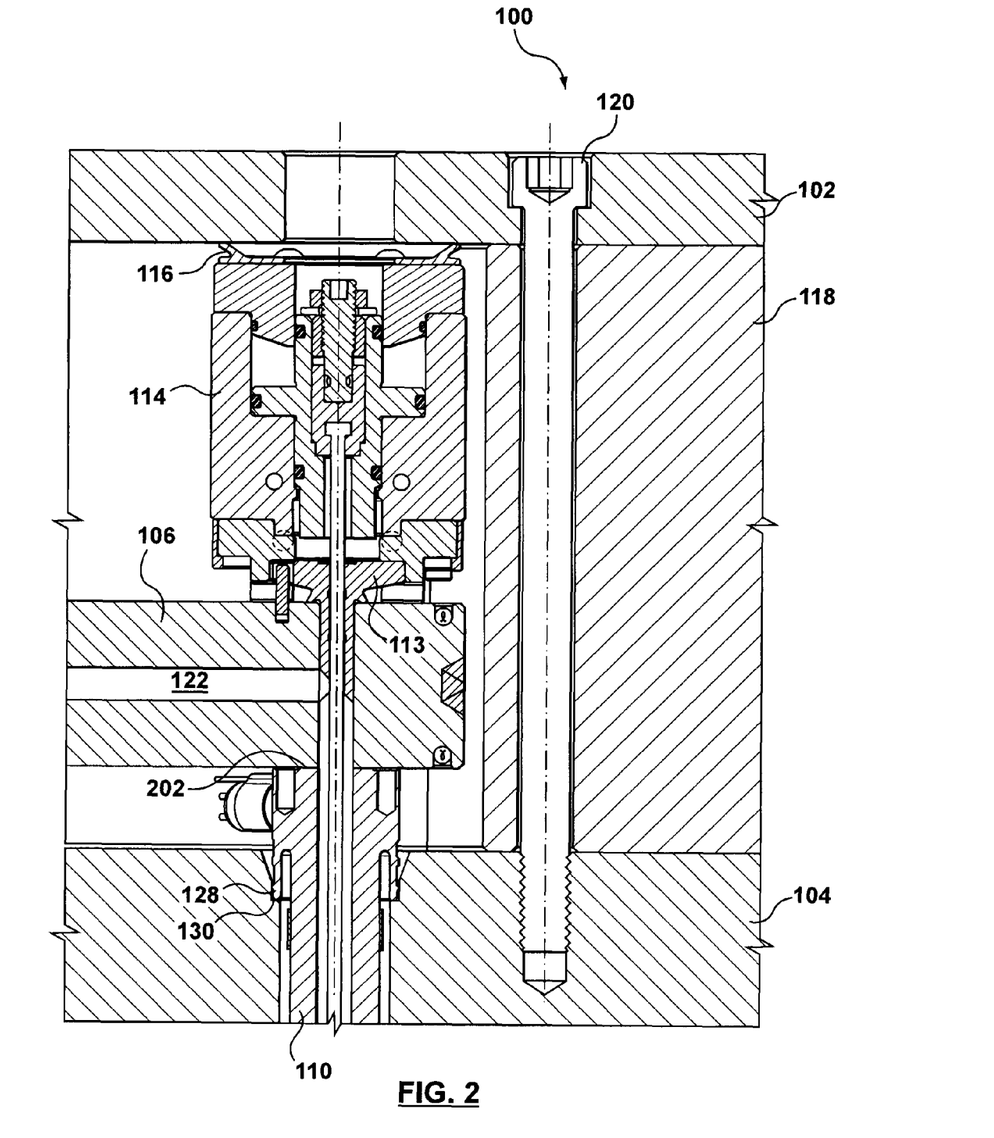
FIG. 2 is a cross-sectional view of a portion of the injection molding apparatus of FIG. 1.

FIG. 2 shows a close-up view of the injection molding apparatus 100 around a portion of the manifold 106. At junction 202 the first load presses the nozzle 110 against the manifold 106 to seal the junction of the nozzle channel 126 and the manifold channel 122.

Figure 3:
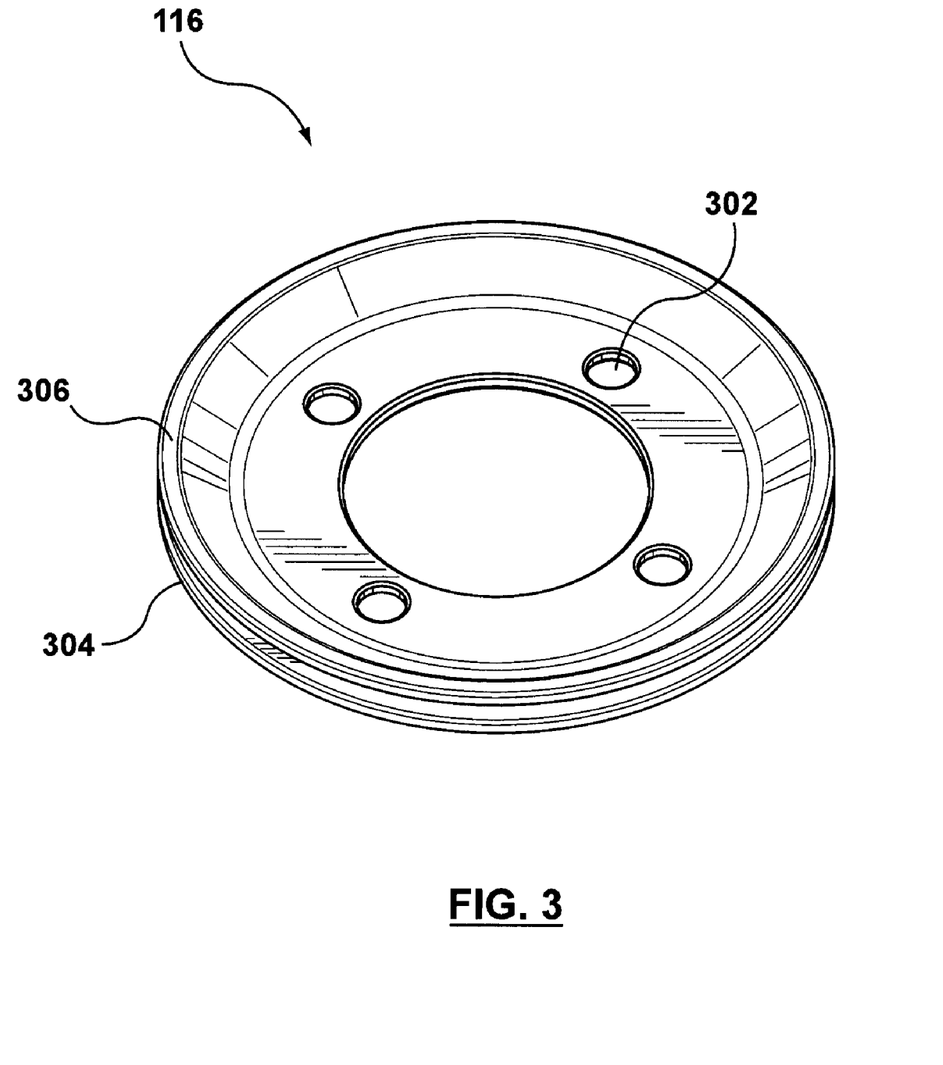
FIG. 3 is a perspective view of the pressure disc of the injection molding apparatus of FIG. 1.

FIG. 3 shows one of the pressure discs 116. The pressure disc 116 includes bolt holes 302 so that the pressure disc 116 can be bolted to the actuator 114. Also shown are a lower lip 304 and an upper lip 306, which provide flexibility to the pressure disc 116 and allow it to evenly transmit load. By way of the lips 304, 306 or by other structure, the pressure disc 116 can be designed for thermal expansion load, so that effects of thermal expansion and/or uneven heating are accommodated or reduced.

Figure 4:
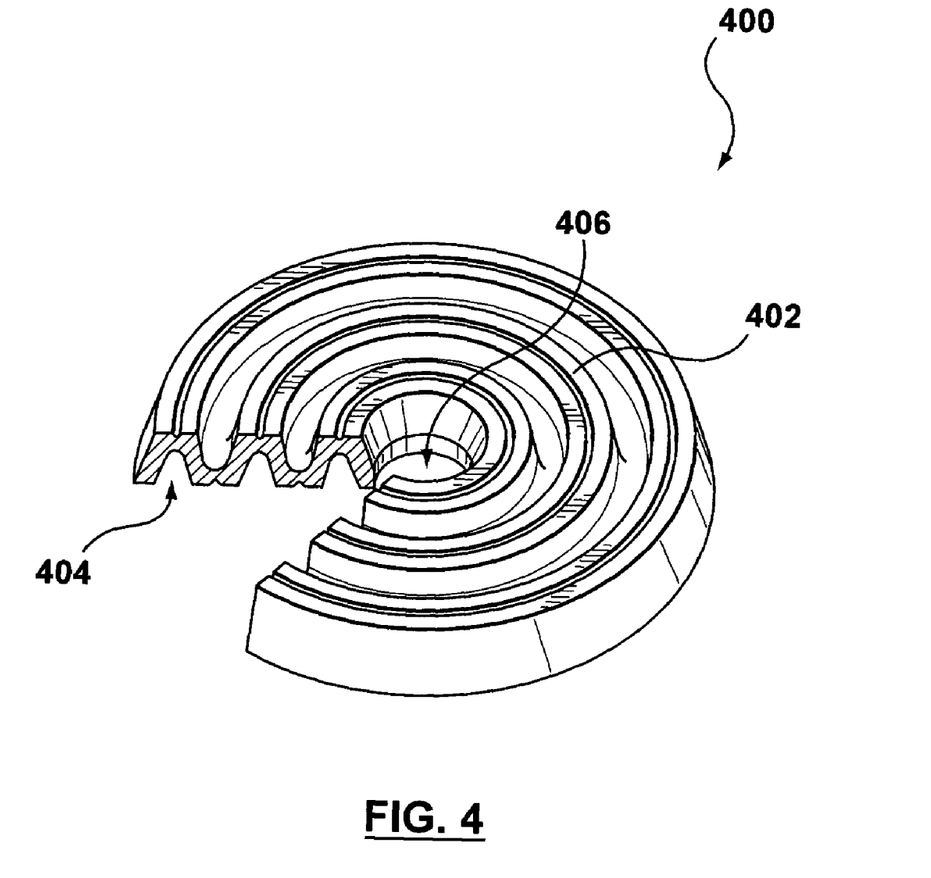
FIG. 4 is a sectioned perspective view of another pressure disc.

FIG. 4 shows another pressure disc 400 that can be used in an injection molding apparatus, such as those described herein. The pressure disc 400 has a radially ridged shape that includes a series of radially offset peaks 402 and valleys 404, and a central hole 406.

Figure 5:
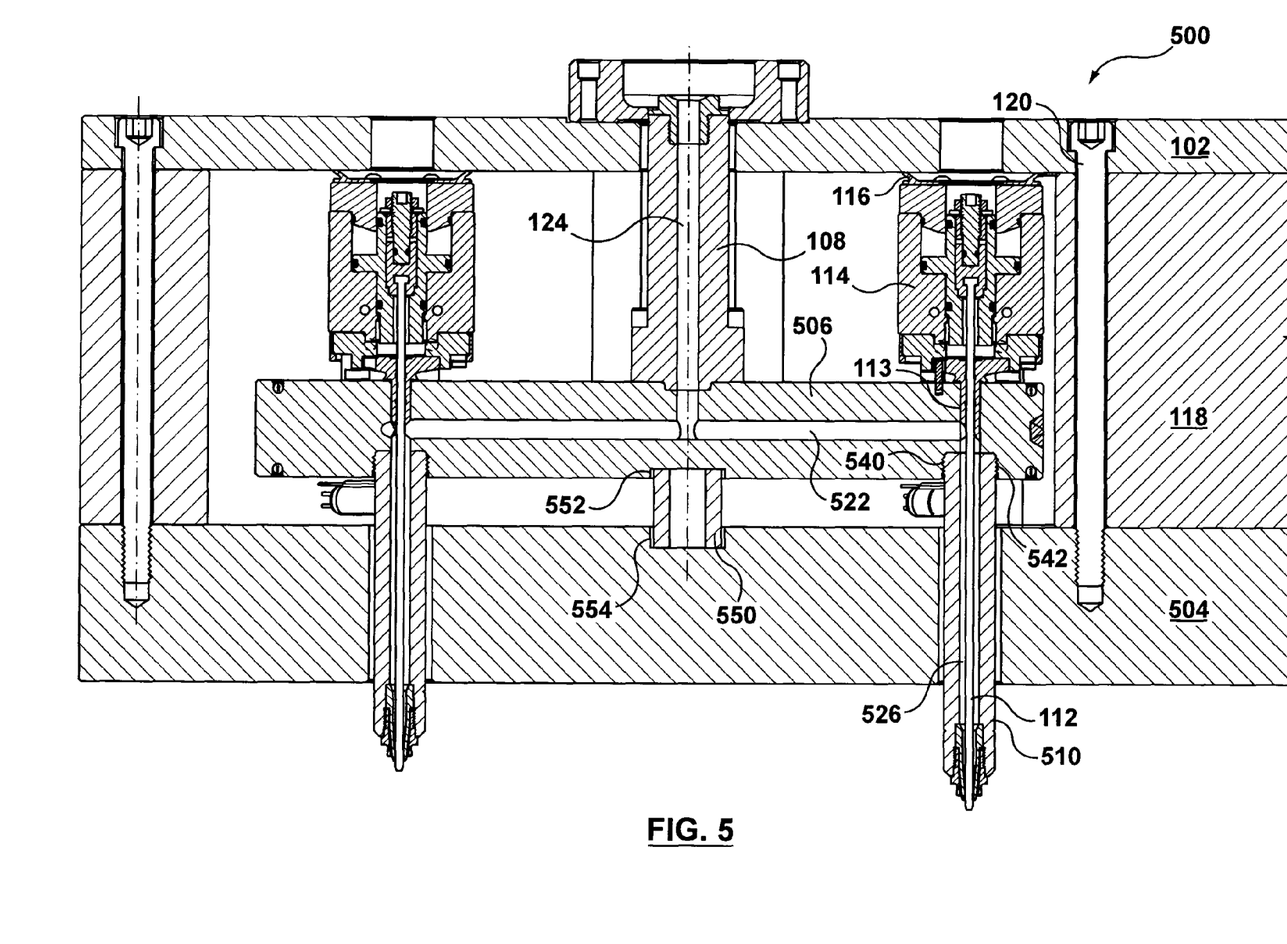
FIG. 5 is a cross-sectional view of an injection molding apparatus according to another embodiment of the present invention.

FIG. 5 shows an injection molding apparatus 500 according to another embodiment of the present invention. In the description of this embodiment, like reference numerals are used to describe like parts for ease of understanding. Only differences from the other embodiments are described in detail. With regard to the remaining features and aspects the other embodiments can be referenced. The features and aspects described for the other embodiments can be used accordingly with the present embodiment.

A manifold 506 includes a manifold channel 522 and threaded bores 540. Nozzles 510 include nozzle channels 526 in communication with the manifold channel 522 and further include threaded ends 542 for threading into the threaded bores 540 of the manifold 506. A locating ring 550 (first support) is provided to locate and support the manifold 506 on the mold plate 504 via recesses 552, 554 in the manifold 506 and the mold plate 504. The locating ring 550 is structurally isolated from the nozzles 510, meaning that the locating ring 550 is a separate piece that does not form part of a nozzle 510. The locating ring 550 transmits the first load between the manifold 506 and the mold plate 504.

In this embodiment, the nozzles 510 do not load the manifold 506. In other embodiments or when the injection molding apparatus 500 is combined with a cavity/cold half, the nozzles 510 can provide some load to the manifold 506, such as sealing forces at the nozzle tips.

In other embodiments, more than one locating ring can be used, or one or more pressure discs can be used instead.

Figure 6:
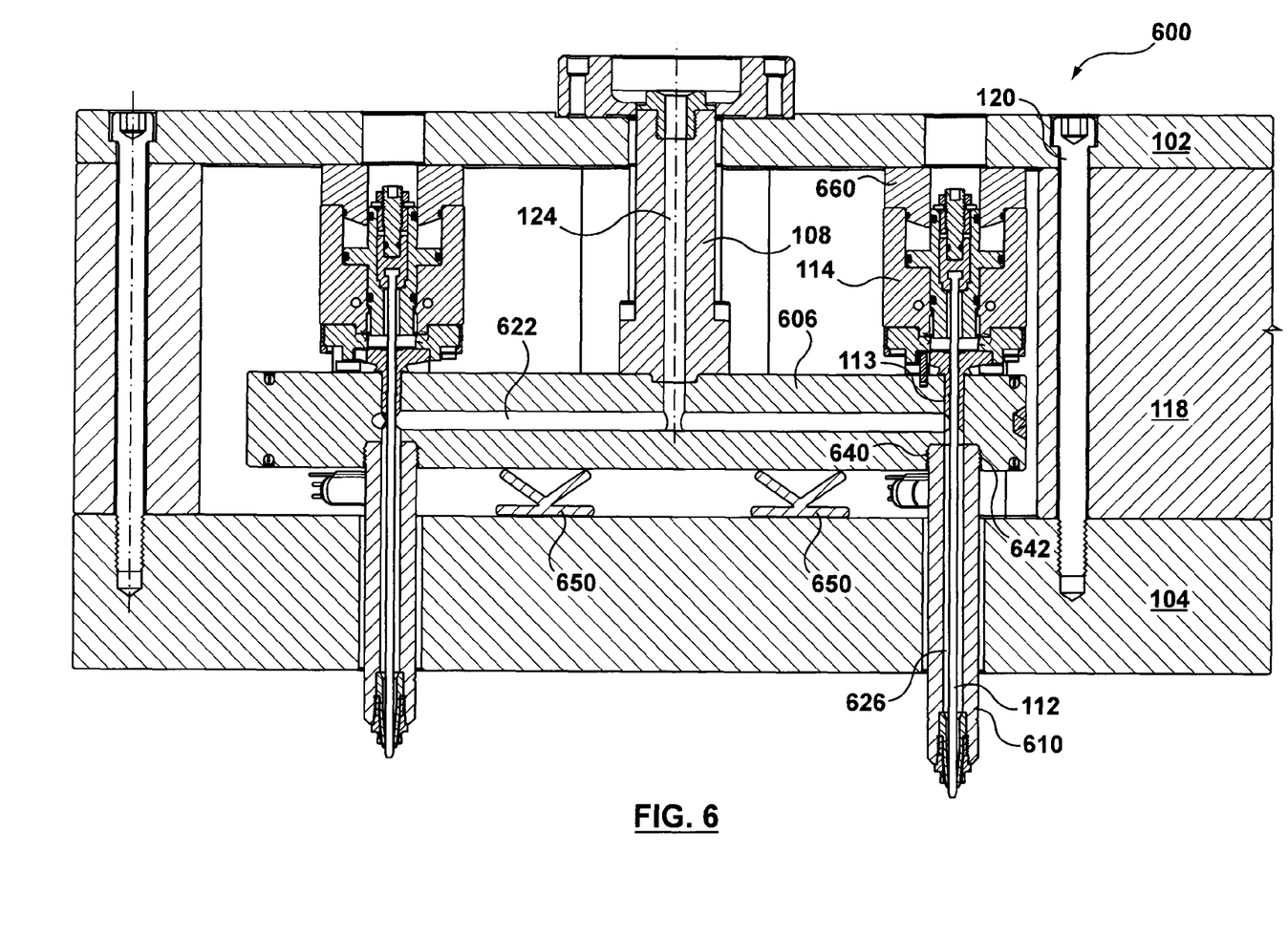
FIG. 6 is a cross-sectional view of an injection molding apparatus according to another embodiment of the present invention.

FIG. 6 shows an injection molding apparatus 600 according to another embodiment of the present invention. In the description of this embodiment, like reference numerals are used to describe like parts for ease of understanding. Only differences from the other embodiments are described in detail. With regard to the remaining features and aspects the other embodiments can be referenced. The features and aspects described for the other embodiments can be used accordingly with the present embodiment.

A manifold 606 includes a manifold channel 622 and threaded bores 640. Nozzles 610 include nozzle channels 626 in communication with the manifold channel 622 and further include threaded ends 642 for threading into the threaded bores 640 of the manifold 606. Pressure discs 650 (first supports) are provided to support the manifold 606 on the mold plate 104. The pressure discs 650 are structurally isolated from the nozzles 610, meaning that the pressure discs 650 are separate pieces that do not form part of a nozzle 610. The pressure discs 650 transmit the first load between the manifold 606 and the mold plate 104. This embodiment lacks pressure discs at the actuators 114, and instead, rigid actuator cap plates 660 contact the back plate 102 to transmit the second load.

In this embodiment, the nozzles 610 do not load the manifold 606. In other embodiments or when the injection molding apparatus 600 is combined with a cavity/cold half, the nozzles 610 can provide some load to the manifold 606, such as sealing forces at the nozzle tips.

In other embodiments, more or fewer pressure discs can be used, or one or more locating rings can be used instead.

In any of the embodiments above, the first support can be a simple block of material.

In additional embodiments, any combination of nozzle flanges, locating rings, pressure discs, bolts, and/or blocks can be used as the first support, and any combination of pressure discs and/or actuator cap plates can be used as the second support.

The first and second supports described herein may be selected or sized to impart sealing forces in the cold condition. For example, the pressure disc 116 of FIG. 1 can be sized to provide a preload to seal the nozzles 110 to the manifold 106 when the injection molding apparatus 100 is assembled but before it is heated to operating temperatures. This can reduce the chance of leakage when the injection molding apparatus 100 is cooled.

Although many embodiments of the present invention have been described, those of skill in the art will appreciate that other variations and modifications may be made without departing from the spirit and scope thereof as defined by the appended claims. All patents and publications discussed herein are incorporated in their entirety by reference thereto.

What is claimed is:
1. An injection molding apparatus, comprising:
a back plate;
an actuator having a movable part connected to a valve pin and an actuator housing surrounding the movable part, the actuator housing including a cap plate disposed between the back plate and the movable part of the actuator; and a pressure disc disposed between the back plate and the cap plate of the actuator housing, the pressure disc directly contacting the back plate and the cap plate of the actuator housing, wherein the actuator is disposed between the pressure disc and a manifold.

2. The injection molding apparatus of claim 1, wherein the pressure disc is bolted to the cap plate of the actuator housing.

3. The injection molding apparatus of claim 1, wherein the pressure disc includes an upper lip contacting the back plate and a lower lip contacting the cap plate of actuator housing.

4. The injection molding apparatus of claim 1, wherein the pressure disc has a radially ridged shape including a series of radially offset peaks and valleys.

5. An injection molding apparatus, comprising:
a back plate;
a mold plate coupled to the back plate;
a manifold disposed between the back plate and the mold plate, the manifold defining a manifold channel and an inlet in communication with the manifold channel;
a nozzle defining a nozzle channel in communication with the manifold channel;
a valve pin extending through the nozzle for controlling flow of molding material through the nozzle channel;
an actuator disposed between the back plate and the manifold, the actuator having a movable part connected to the valve pin;
at least one first support transmitting a first load between the manifold and the mold plate, the at least one first support being one of a flexible support and a rigid support; and
at least one second support positioned between the back plate and the actuator to transmit a second load between the back plate and the manifold through the actuator, the at least one second support being the other of a flexible support and a rigid support,
wherein the first load and the second load acting on the manifold are balanced.

6. The injection molding apparatus of claim 5, wherein a plurality of actuators are disposed between the back plate and the manifold, and a plurality of second supports are disposed between the plurality of actuators and the back plate, wherein each second support transmits a portion of the second load.

7. The injection molding apparatus of claim 5, wherein the first support comprises a plurality of first supports, wherein each first support transmits a portion of the first load.

8. The injection molding apparatus of claim 5, wherein the sum of the first load and the second load acting on the manifold is zero.

9. The injection molding apparatus of claim 5 further comprising at least one bolt connecting the back plate to the mold plate.

10. The injection molding apparatus of claim 5, wherein the first support is a rigid support and the second support is a flexible support.

11. The injection molding apparatus of claim 10, wherein the rigid support comprises a flange of the nozzle.

12. The injection molding apparatus of claim 10, wherein the rigid support comprises a locating ring.

13. The injection molding apparatus of claim 10, wherein the flexible support comprises a pressure disc.

14. The injection molding apparatus of claim 5, wherein the first support is a flexible support and the second support is a rigid support.

15. The injection molding apparatus of claim 14, wherein the flexible support is a pressure disc that is structurally isolated from the nozzles.

16. The injection molding apparatus of claim 14, wherein the rigid support is a portion of the actuator in contact with the back plate.

17. An injection molding apparatus, comprising:
a back plate;
a mold plate coupled to the back plate;
a manifold disposed between the back plate and the mold plate, the manifold defining a manifold channel;
an inlet component defining an inlet channel in communication with the manifold channel;
a nozzle defining a nozzle channel in communication with the manifold channel;
a valve pin extending through the nozzle for controlling flow of molding material through the nozzle channel;
an actuator disposed between the back plate and the manifold and connected to the valve pin;
a first support structurally isolated from the nozzle, the first support transmitting a first load between the manifold and the mold plate; and
a second support disposed between the back plate and the actuator and transmitting a second load between the back plate and the manifold.

18. The injection molding apparatus of claim 17, wherein the first support comprises a locating ring.

19. The injection molding apparatus of claim 17, wherein the first support comprises a pressure disc.

20. The injection molding apparatus of claim 17, wherein the first support comprises a plurality of first supports, wherein each first support transmits a portion of the first load.

21. The injection molding apparatus of claim 17, wherein the second support comprises a portion of the actuator in contact with the back plate.

22. The injection molding apparatus of claim 17, wherein the second support comprises a pressure disc disposed between the actuator and the back plate.

23. The injection molding apparatus of claim 17, wherein the second support comprises a plurality of second supports, wherein each second support transmits a portion of the second load.

24. The injection molding apparatus of claim 17, wherein the sum of the first load and the second load acting on the manifold is zero.

25. The injection molding apparatus of claim 17, wherein the nozzle does not load the manifold.

26. The injection molding apparatus of claim 17, further comprising at least one bolt connecting the back plate to the mold plate for establishing a bolt load therebetween.

* * * * *